Patented Dec. 21, 1937

2,103,220

UNITED STATES PATENT OFFICE 2,103,220

CONTROLLED OXIDATION

Leslie G. Jenness, Brooklyn, N. Y.

No Drawing. Application March 4, 1935,
Serial No. 9,264

4 Claims. (Cl. 23—210)

The present invention relates to the oxidation of oxidizable gases. More particularly, it relates to a process of oxidation of such gases and a specific method of controlling the oxidizing agent. Like the process described and claimed in my pending application Serial No. 4,095 filed January 30, 1935, the process of this invention has particular application to the oxidation of such harmful oxidizable gases as may be combined with or contained in useful or desirable gases. Of such applications of the process, one of great commercial importance occurs in the oxidation of the carbon monoxide present in hydrogen produced by ordinary commercial methods.

In practically all of the processes for producing hydrogen commercially, the product is contaminated with carbon monoxide to a highly objectionable degree. Indeed, for many purposes for which hydrogen is utilized, it must be pure or substantially so. It must, particularly, be practically free from carbon monoxide. The elimination of this undesirable gas is especially important in the process of hydrogenating oils and also in producing compounds of nitrogen and hydrogen. In these and other processes, the efficient elimination of carbon monoxide from hydrogen is extremely important.

In cases where hydrogen is mixed with even a comparatively small percentage of carbon monoxide, it has been difficult and expensive, by any of the present processes, to eliminate it and thus to produce a satisfactorily pure hydrogen. The problem, long understood by the chemist, is to effect an oxidation of the carbon monoxide without oxidizing the hydrogen. If the carbon monoxide could be completely oxidized to carbon dioxide, it would be a comparatively simple matter to get rid of it by well known scrubbing processes. If, however, in effecting such oxidation, the hydrogen also is oxidized in considerable quantities, water will be thereby formed. There is a strong probability, therefore, that the process will be inefficient by reason of the large quantity of hydrogen lost in the formation of water, and not commercial because of the small yield of pure hydrogen.

This problem of eliminating carbon monoxide has been aptly expressed by the statement that if the reaction $$2CO + O_2 \rightarrow 2CO_2$$

can be obtained without the reaction $$2H_2 + O_2 \rightarrow 2H_2O$$

substantially pure hydrogen may be obtained. Practical methods of solving this problem have, however, been difficult of attainment. While these methods have involved a recognition of the principle that the temperatures at which carbon monoxide oxidation is to be carried out must be kept relatively low, and the increase of the activity of the particular catalyst used has a marked effect in increasing these temperatures, the regulation of catalytic activity has not been understood. Nor has it been understood how the temperature of reaction may be controlled. Thus, although it has been recognized that (1) heat is liberated in the reaction $$2CO + O_2 \rightarrow 2CO_2$$

as well as in the reaction $$2H_2 + O_2 \rightarrow 2H_2O,$$

(2) that the rate of these reactions is increased by increased temperatures, and (3) that the increase in the rate of hydrogen oxidation is faster than that of carbon monoxide oxidation as the temperature increases,—it has not been known how to control these factors by the production and in the use of catalysts that have a degree of activity enabling the desired reaction to be carried out without the generation of so much heat as to cause a substantial quantity of hydrogen to be oxidized and a concomitant deterioration of the catalyst.

It is the characteristic, also, of prior art processes designed for the purpose of oxidizing the carbon monoxide impurity of hydrogen, that the catalysts or oxidizing agents become spent beyond the possibility of reactivation and must be thrown away and wasted, and a new change of catalyst is required for the removal of any further quantities of carbon monoxide. This interrupts the process, leads to increased costs, and involves many disadvantages.

I have found that it is possible to regulate the temperature at which carbon monoxide may be oxidized from intermixture with hydrogen so as to enable this reaction to be carried out without substantial oxidation of the latter. I have found it possible to do this by controlling the activity of the oxidizing agent used for the reaction by ensuring the presence of oxygen therein within a definite range of proportions to the total quantity of catalyst. In this way a controlled supply of available oxygen for carrying out the desired reaction is maintained. There is thus secured a more even distribution of heat generated on the surface of the catalyst and a more constant temperature of operation than would occur if such specially adapted catalyst were not used. I have also found that I can carry out the desired reaction by a process in which the catalyst, when partially exhausted, may be reactivated for further use, and I may reactivate either continuously or in an intermittent manner without interrupting the desired oxidizing process.

The continuous process of oxidizing carbon monoxide from hydrogen or gases containing hydrogen and inert gases, is described and claimed in my aforesaid copending application, in which desirable oxidizing catalysts are disclosed as well as various ways in which they are prepared and ways in which they can be efficiently utilized in the continuous and uninterrupted oxidation of carbon monoxide in the presence of free oxygen.

The present invention relates to a cyclic process of oxidizing carbon monoxide from hydrogen in the absence of free oxygen and in this respect differs from that described and claimed in my aforesaid application, as the physical steps taken to accomplish the desired results are dissimilar. The principles involved in the production of desirable catalysts or oxidizing agents and in their behavior during the reactions in mind are substantially the same. As will hereinafter be explained, the process of the present invention may, however, be carried out so that the oxidation of carbon monoxide from a given quantity of gas is not interrupted, and the same ultimate result as that of my previously referred to process achieved. Fundamentally, the processes differ in their approach to the problem of reactivating the catalysts or oxidizing agents, for in the prior application alluded to, this reactivation is carried out continuously during the carbon monoxide oxidation, while in the present process the reactivation is carried out intermittently between successive carbon monoxide oxidations.

When oxidizing carbon monoxide from hydrogen in the continuous manner described and claimed in my aforesaid copending application, there seems to be an interaction between the catalysts or oxidizing agents employed, the free oxygen or air supplied and the carbon monoxide of the mixture of the gases to be treated. The mixture of gases to be treated and the free oxygen or air are supplied simultaneously in a continuous stream to the catalysts. Thus, as the carbon monoxide is oxidized to carbon dioxide, the catalyst tends to yield a portion of its available oxygen. At the same time, however, there is a tendency on the part of the catalyst, as it becomes more and more depleted of available oxygen to take up additional oxygen from the stream of free oxygen or air supplied to it. The process of that invention is thus seen to be continuous and the catalysts capable of indefinite use.

The process of the present invention, on the other hand, is distinguished from the process of my said copending application in that, while the same type of catalyst or oxidizing agent may be employed, the free oxygen or air and hydrogen intermixed with carbon monoxide are not supplied simultaneously in a continuous stream but are fed intermittently. Thus, the hydrogen intermixed with carbon monoxide is contacted with the oxidizing agent for a certain predetermined time, after which, the oxidizing agent having become somewhat spent, the hydrogen is shut off and the free oxygen or air is passed over or through the bed of oxidizing agent to reactivate it.

The efficiency of the oxidizing agent as well as its extremely long life depends in large measure on its capacity to fluctuate under the conditions of a given reaction within a range hereinafter determined and disclosed, the upper limit of the range being an oxide having a given amount of available oxygen, and the lower limit being an oxide having a somewhat smaller amount of available oxygen. It is possible that any higher oxide and any lower oxide would fulfill the conditions required of the catalyst of the present invention, provided it were possible to cause the oxide to fluctuate between a state approximating the higher oxide and the state approximating the lower oxide. However this may be, a catalyst consisting of manganese oxides will, during the operation of the process, fluctuate between the state of $Mn_2O_3$ and the lower state of $Mn_3O_4$ and, within that range, a very efficient oxidation of the carbon monoxide will take place with little or no oxidation of the hydrogen.

In carrying out the process of the present invention to operate intermittently but in a cyclic manner in the oxidation of carbon monoxide from intermixture with hydrogen, a gas mixture containing hydrogen and carbon monoxide is passed over a manganese oxide at a temperature regulated at a point somewhat below that at which substantial hydrogen oxidation takes place, which point I have determined to be in the neighborhood of 175° C. The manganese oxide that permits such regulation of temperature is preferably a modified form of that described and claimed in my United States Patent No. 1,937,488, dated November 28, 1933. The precise manner of modification of such a manganese oxide will be seen from the following detailed description of the invention.

A foraminate manganese dioxide may be made according to the aforesaid patent by converting a manganese dioxide to manganese sesqui-oxide, by subjecting it to the action of reducing gases, then dissolving the divalent manganese with a suitable acid, and then filtering, washing, pressing, breaking up and drying the resultant foraminate product. If such an oxide is prepared by carrying out the final drying step at 200° C., a product analyzing $MnO_2$ is obtained. Such an oxide if used to oxidize carbon monoxide from hydrogen, will cause the heat of reaction to rise almost immediately to a point where the particles of the catalyst incandesce, where a large amount of hydrogen is oxidized to water and where the oxide is reduced to an extent that it is substantially spent. This spent oxide can be revivified or reactivated to function again to oxidize carbon monoxide only with difficulty.

One way in which the above mentioned oxide dried at 200° C. is modified is by treating it with a gas containing small quantities of carbon monoxide, and subsequently treating it with an oxygen-containing gas prior to use in the desired carbon monoxide oxidation reaction. In this way the initial sudden increase in temperature is avoided. An oxide modified in this manner may be used for a considerable period in efficiently oxidizing carbon monoxide by merely passing the hydrogen-carbon monoxide mixture thereover at a suitable temperature. During the procedure an uncontrolled increase of temperature to a point where the hydrogen is oxidized to any substantial degree is obviated. When a drop in efficiency is noted, the gas supply is cut off and the oxidizing agent may be reoxidized by flowing free oxygen or air over it.

From the above it is apparent that the desirable oxidizing agent is one which is a reduced form of manganese dioxide,—one in which the amount of oxygen available for oxidizing purposes is somewhat below that contained in manganese dioxide. By careful experimentation and analysis I have found that the desirable oxide is one which in chemical composition lies somewhere between manganese dioxide ($MnO_2$) and mangano-manganic oxide ($Mn_3O_4$). As indicated above, however, the oxide is continually having its supply of available oxygen depleted and when this supply drops to a certain figure the supply of gas to be treated must be cut off and the oxide reactivated by passing free oxygen or air over it. This alternate reduction and oxidation may be carried out indefinitely so long as the oxide is not over-reduced, in which case, as will hereinafter appear, special methods of reoxidation are necessary in order to bring the oxide back to its original state of activity.

The exact composition of the above mentioned oxidizing agent at a given instant is determinable only with difficulty, but throughout the period of use it ranges between $MnO_2$ and $Mn_3O_4$, and probably constitutes mixtures of manganese oxides in varying degrees of oxidation. The oxidizing agent, however, even when fully reactivated, never actually reaches the upper limit ($MnO_2$) as this is much too active for the purposes in mind. It might be and probably is true that analysis would show some $MnO_2$ in the particles of my oxidizing agent at any given time during its operation, but such $MnO_2$ is undoubtedly contained within the particle where its action is either very limited or non-existent.

While I have indicated a somewhat broad range within which lies the preferable form, or mixtures of forms, of the oxide used in the present invention, I can with reasonable certainty define that range more specifically, as I have found that its available oxygen, when operating at 100% efficiency, is within the range of about 8% to 10%, compared with 14% to 14.5% for the original $MnO_2$ prepared from pyrolusite ore. This corresponds to a mixture of manganese sesquioxide ($Mn_2O_3$) and manganese dioxide ($MnO_2$), the surface of which is reduced to the form of a lower oxide or mixture of lower oxides.

By available oxygen I refer to the standard meaning of the term, the percentages being commonly determined by ascertaining that portion of the total compound or mixture which is available for and capable of oxidizing an acidic solution of ferrous sulphate or oxalic acid.

I have found, however, that an oxide having as little as 8% available oxygen will alone operate efficiently for a considerable time to oxidize carbon monoxide from hydrogen. Such an oxide undoubtedly represents a manganese compound consisting predominantly of $Mn_2O_3$ and the desirable range of fluctuation of the catalyst during the desired oxidizing reaction is undoubtedly between $Mn_2O_3$ and $Mn_3O_4$, the oxidizing agent never, however, approaching sufficiently close to the lower oxide that it cannot be reoxidized by the free oxygen to $Mn_2O_3$.

Expressed otherwise, the desirable catalyst or oxidizing agent for efficient carbon monoxide oxidation in the manufacture of hydrogen is one which varies between a manganese compound having one-half an available oxygen atom per atom of manganese ($Mn_2O_3$) and one having one-third an available oxygen atom per atom of manganese ($Mn_3O_4$). Due to the fact, however, that some $MnO_2$ may be present in the interior of a particle of such an oxide, the desirable oxide may contain by analysis between one-third of an atom and one atom of available oxygen per atom of manganese.

Another way in which I may modify a manganese dioxide catalyst and form it into a lower oxide which is thus rendered selectively active for carbon monoxide oxidation, is by regulating the heat of drying, and therefore the degree of hydration, of the foraminate catalyst or oxidizing agent. Thus, if the catalyst or oxidizing agent, after leaching, filtering, washing, pressing and breaking up the foraminate product, is dried at somewhat lower temperatures than those indicated as preferable in my Patent No. 1,937,488, for instance, at 110 to 115° C., the same can be made to operate efficiently to oxidize carbon monoxide from hydrogen without an undue rise in the temperature of the oxide bed. In fact, it is sometimes necessary during the process to supply heat to the reaction to maintain it above 100° C.

After drying, the desired oxidation is carried out for several hours and the oxidizing agent becomes reduced to the state previously described. As will hereinafter be more fully explained, the purpose of drying at a lower temperature is to prevent the manganous acid formed during the leaching treatment from being fully dehydrated and thus to form a partially hydrated manganese dioxide which when used to oxidize carbon monoxide will perform the oxidation at a reduced rate and will facilitate the attainment of the desired stage of oxidation without due increase in temperature. The same ultimate result is achieved, i. e., the production of a manganese oxide in an intermediate stage of oxidation.

The following specific examples of my process are given for purposes of illustration:

*Example 1*

A charge of manganese dioxide made according to my Patent No. 1,937,488 is pressed and broken up into particles ranging in size from ¼" to ½" in diameter and dried at 85 to 90° C. in an air circulating oven for a period of sixteen hours, after which the material is dried at 200° C. until there is no further loss in weight. A gas mixture containing a small quantity of CO, about 1%, and the balance composed of 99% carbon dioxide, is passed over the catalyst. This gas mixture may be varied by using a mixture of 1 to 5% carbon monoxide and the balance composed of one or more inert gases, such as nitrogen or carbon dioxide. This may be conveniently accomplished in a converter provided with temperature control means. Into a converter of this nature, 4" in diameter and 29" in height, having a volume of about 364 cubic inches, 11.4 pounds of oxidizing agent is charged and the gas mixture passed through it at a rate of about 10 liters per minute for a period of four hours, the temperature being maintained at 125–135° C. Air may then be passed through the converter at the rate of 10 liters per minute for a period of four hours. This constitutes the preliminary reduction and reoxidizing treatment and the hydrogen gas containing carbon monoxide may then be passed through the converter at a rate of about 10 liters per minute. This effects 100% oxidation of the carbon monoxide without creating a temperature rise sufficient to cause substantial oxidation of hydrogen. A gas mixture having an approximate composition as follows may be efficiently treated with an oxidizing agent prepared as above outlined:

| | Per cent |
|---|---|
| Carbon monoxide | 1 |
| Hydrogen | 74.5 |
| Carbon dioxide | 24.5 |

The presence of carbon dioxide is, of course, not necessary in the practice of carbon monoxide oxidation with the oxidizing agents of the present invention, as the same is inert as far as concerns the reactions dealt with. There are many cases where, due to the preparation of hydrogen from water gas and similar products, the presence of considerable quantities of carbon dioxide is unavoidable, and the treatment of such a gas has been given merely for illustrative purposes. The oxidizing reaction proceeds in precisely the same way in the absence of carbon dioxide.

If desired, preliminary reduction and oxidation may be carried out by the use of a single inert gas containing small quantities of carbon monoxide and oxygen.

Oxidaton of carbon monoxde proceeds at 100% efficiency for about six hours when the treatment is applied as above outlined, at the end of which period the oxide mass is reoxidized by passing air through it for 3 to 4 hours while maintaining the charge at about 110–115° C. The air may be passed through at the rate of about five liters per minute. At the conclusion of this reoxidizing treatment, the charge is in condition to act effectively during a further reduction period of about six hours and the cycle is thus repeated. It will be apparent that the process proceeds first as a reduction of the foraminate manganese dioxide to lower oxide forms suitable for use in a cyclic treatment comprising an initial reduction by the carbon monoxide-containing gas followed by a reoxidation by the free oxygen-containing gas.

*Example 2*

The pressed and sized catalyst prepared as described in my Patent No. 1,937,488 is dried at 85° to 90° C. in an air circulating oven for about sixteen hours and then charged into a converter similar to that described in Example 1. The temperature is increased to 110–115° C. where it is maintained for a period of about five hours while a slow stream of air is passed through for the purpose of carrying off moisture liberated under these conditions.

This partially hydrated $MnO_2$ may be converted to lower oxide forms by passing certain modified reducing gases over the oxide in a converter like that described in Example 1, under conditions which will enable the temperatures to be regulated below 175° C. A convenient reducing gas used for this treatment is one comprising the gas mixture to be treated, such as that referred to in the previous example. With such a gas, little, if any, initial excess heat of reduction is apparent. After a reduction period of several hours, the oxide is ready for use in oxidizing carbon monoxide from hydrogen in a cyclic manner, which is conveniently accomplished as described in Example 1.

If the above mentioned preliminary treatment is carried out a longer time, carbon monoxide will start to leak through the charge, after a period of operation of about 24 hours. At this time the oxide bed consists of some light brown particles and some black particles carrying a deep brownish cast. The former particles show an available oxygen content of 4.9% and the latter particles show 9.6%. The material showing about 4.9% would correspond with the oxide $Mn_3O_4$ slightly diluted with silica. It would appear, therefore, that $Mn_3O_4$ is incapable of efficiently oxidizing carbon monoxide and when a sufficient quantity of this oxide is produced channeling will take place and carbon monoxide will be present in the exit gas. When this oxide is reactivated by passing free oxygen or air over it for 3–4 hours at 110–125° C., the same may again be used efficiently to oxidize carbon monoxide and the cycle may be repeated.

The initial operations of the process conducted as above described must be considered as preliminary equalizing treatment until the point at which the desired oxide is formed, and must not, therefore, be considered part of the treatment wherein carbon monoxide is removed with 100% efficiency. The actual efficient oxidation of carbon monoxide does not occur until after oxidation with the oxide dried at 110–115° C. has progressed for a few hours. As above indicated, these initial operations may well be segregated as a preliminary treatment carried out independently in order to prepare the catalyst for use.

It is noteworthy that in preparing the oxide mass from manganese dioxide, it is important to convert the dioxide to lower oxide forms by means of reducing gases and under reducing conditions which will not materially increase the temperature of the mass while accomplishing this reduction. So long as reduction can be accomplished in this manner, any reducing means or material may be used, and the reduced mass readily adjusts itself to fluctuation or variation between the limits noted, as a result of the reducing action of carbon monoxide on the one hand and the oxidizing action of the oxygen-containing gas on the other. Generally the fact that the catalyst or oxidizing agent prepared as described in my prior patent is dried at lower temperatures, permits a more concentrated reducing gas to be used, as the partially hydrated $MnO_2$ thus formed does not respond so easily to the reducing treatment. This is probably explained by the theory that a catalyst or oxidizing agent made as hereinabove described according to the said patent is, before drying, in a hydrated condition and is in the form of manganous acid ($H_2MnO_3$). When it is completely dried, it is, of course, fully dehydrated. It is most active when fully dehydrated. When hydrated, the product is associated with hydroxyl radicals instead of oxygen atoms and varying degrees of dehydration will drive off these radicals and increase the proportion of oxygen atoms to a greater or less extent. By regulating the degree of hydration of the catalyst or oxidizing agent, therefore, it is possible to regulate the proportion of these oxygen atoms to the total composition, and thus to prevent the accumulation of heat on a restricted surface of the oxide during the desired carbon monoxide oxidation. It is thus possible to cause the heat of reaction to be evenly distributed throughout the bed of oxidizing agent and thus to prevent the temperature from rising to a point where substantial quantities of hydrogen are oxidized.

Under certain conditions it may be advisable to introduce small quantities of methanol and air in the preliminary equalization or reduction of the catalytic or oxide mass.

In the above examples it is, of course, understood that specific figures as to the size of the converter and amount of oxide have been given for the purpose of illustration merely, and increase in the size of the equipment used will necessitate an increased amount of gas to take care of the larger quantity of oxide. For a given amount of gas to be handled, the proper balance between the quantity of gas and the amount of oxide used will be readily perceived by those skilled in the art upon an understanding of the principles herein laid down. So also, those skilled in the art will readily understand that relation between the size of the oxide charge and the volume of carbon monoxide to be treated will govern the time of each cycle, and that this may be adjusted to suit convenient and efficient operation.

The preferable temperatures at which an oxidizing agent prepared as described in Example 2 is dried are from in the neighborhood of 110° to 115° C. Temperatures above this range liberate too many hydroxyl radicals and there occurs a rapid rise in the temperature of the upper portion of the oxide bed, with the oxidation of considerable quantities of hydrogen along with the carbon monoxide. Temperatures of drying below this range are insufficient to liberate sufficient hydroxyl radicals and it is actually necessary to supply heat to the reaction during the process in which the oxide is used, in which, of course, no appreciable quantities of hydrogen are oxidized.

When the oxidizing agent is dried at 200° C., the same is usually completely dehydrated and, as in Example 1, must be differently treated, but the ultimate oxide is the same in that it comprises lower oxide forms.

As the oxidizing agent is exposed to the action of carbon monoxide containing gases in the absence of the required amount of free oxygen, the oxide is gradually reduced and it is natural to expect that the oxygen lost is that portion which exists at the surface in a relatively high degree of freedom. It has been found that if the product is not over-reduced it can be reactivated by passing air over the oxide mass at a temperature of about 125° C. There are cases, however, where this form of reactivation is not highly effective and this appears to exist when the product is reduced quite excessively. Under these conditions it has been found that the passage of steam over the material at a temperature slightly above 100° C., followed by a dry current of air at a temperature of about 125° C. will bring the oxide back to its original state of activity. It seems logical to attribute the cause of this reactivation to the fact that the reduced manganese is first hydrated to manganous acid by the action of steam and that it is then in the same form as that existing after foramination. This hydrated product may then be dried by any suitable method, after or during which it may be reduced to the desired intermediate stage of oxidation. The oxide, therefore, undergoes a cycle of dehydration, reduction and hydration.

While the invention has been described with particular reference to the utilization of the catalysts or oxidizing agents described and claimed in my prior Patent No. 1,937,488, it should be understood that the invention is not limited in its appliaction to such agents. The oxidizing agents of the present invention comprising manganese oxides of the described intermediate stage of oxidation, may be obtained directly from manganese ore or otherwise, and although these agents are not so desirable as those developed from the foraminate catalysts, their use for some purposes may be beneficial.

While the process of the present invention has been illustrated as taking place by first passing the desired gas over the oxide and afterwards cutting off the gas flow and passing free oxygen or air over the oxide to reactivate it, the process is well adapted for use in standard cyclic equipment, arranged to allow one portion or charge of the oxide to be reactivated by passing an oxygen-containing gas therethrough, while another portion or charge operates to oxidize carbon monoxide when the gas to be treated is brought into contact with it. Thus, the desired oxidation may be accomplished without substantial interruption. The conditions to be maintained during such application of the process will readily appear to persons skilled in the art upon an understanding of the principles herein disclosed.

Having thus described my invention, what I claim is:

1. The process of substantially completely oxidizing carbon monoxide from gases containing hydrogen and carbon monoxide without oxidizing said hydrogen, which comprises alternately contacting said gases and gases containing free oxygen with a mixture of manganese oxides to alternately reduce and reoxidize said oxides, said carbon monoxide being oxidized during the reduction of said oxides, said oxides having been previously reduced from manganese dioxide at a temperature below 175° C. so that they contain less than one and more than one-third atom of variable oxygen per atom of manganese, discontinuing each oxidation of said carbon monoxide before the available oxygen of said oxidation falls to one-third of an atom of available oxygen per atom of manganese and discontinuing each reoxidation of said oxides before the available oxygen thereof increases to one atom of available oxygen per atom of manganese.

2. The process of substantially completely oxidizing carbon monoxide from gases containing hydrogen and carbon monoxide without oxidizing said hydrogen, which comprises, alternately contacting said gases and gas containing free oxygen with a mixture of manganese oxides to alternately reduce and reoxidize said oxides, said carbon monoxide being oxidized during the reduction of said oxides, said oxides having been previously reduced from manganese dioxide at a temperature below 175° C. so that they contain less than one and more than one-third atom of available oxygen per atom of manganese, maintaining the temperature of the reaction during each oxidation of carbon monoxide between 100 and 175° C., discontinuing said oxidation of carbon monoxide before the available oxygen of said oxides falls to one-third of an atom of available oxygen per atom of manganese and discontinuing each reoxidation of said oxides before the available oxygen thereof increases to one atom of available oxygen per atom of manganese.

3. The process of substantially completely oxidizing the carbon monoxide impurities from gases containing hydrogen, which comprises, alternately contacting said gases and gases containing free oxygen with a mixture of oxides of manganese to alternately reduce and reoxidize said mixture of oxides, said carbon monoxide being oxidized during said reduction of said oxides, said oxides having been previously reduced from manganese dioxide at a temperature below 175° C., maintaining the temperature during oxidation of said carbon monoxide between 100 and 175° C., and maintaining said mixture of oxides during said contacting in a state of oxidation in which they contain less than one and more than one-third atom of available oxygen per atom of manganese.

4. The process of substantially completely oxidizing the carbon monoxide impurities from gases containing hydrogen which comprises alternately contacting said gases and gases containing free oxygen with a mixture of oxides of manganese to alternately reduce and reoxidize said mixture of oxides, said carbon monoxide being oxidized during reduction of said oxides, said oxides having been previously reduced from manganese dioxide at a temperature below 175° C., maintaining the temperature during said oxidation of carbon monoxide below the temperature at which hydrogen oxidizes, and maintaining said mixture of oxides during said contacting in a state of oxidation in which they contain less than one and more than one-third atom of available oxygen per atom of manganese.

LESLIE G. JENNESS.